J. H. HAMMOND, Jr.
SYSTEM OF RADIOCONTROL.
APPLICATION FILED JAN. 22, 1914. RENEWED MAY 22, 1920.

1,370,688.

Patented Mar. 8, 1921.
2 SHEETS—SHEET 1.

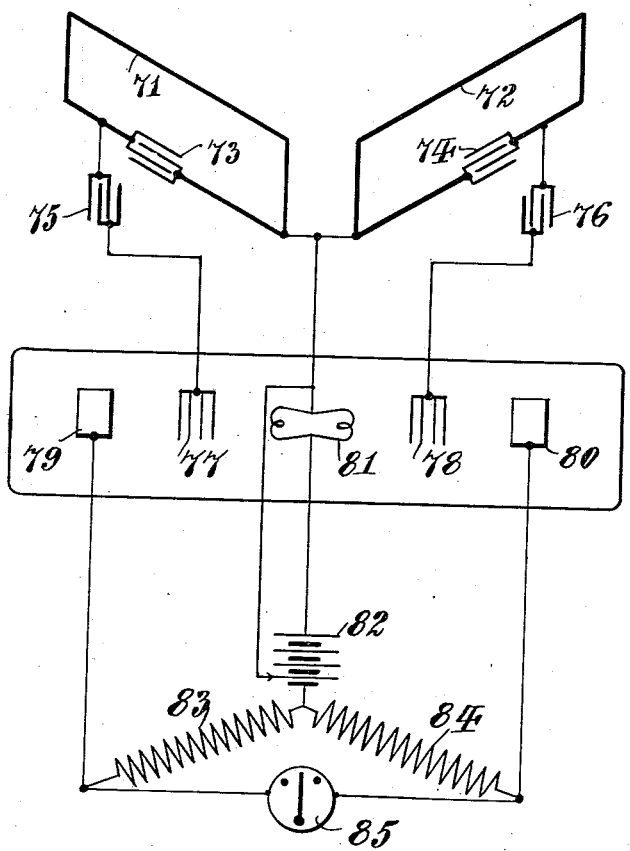

UNITED STATES PATENT OFFICE.

JOHN HAYS HAMMOND, JR., OF GLOUCESTER, MASSACHUSETTS.

SYSTEM OF RADIOCONTROL.

1,370,688.

Specification of Letters Patent. Patented Mar. 8, 1921.

Application filed January 22, 1914, Serial No. 813,617. Renewed May 22, 1920. Serial No. 383,601.

*To all whom it may concern:*

Be it known that I, JOHN HAYS HAMMOND, Jr., a citizen of the United States, residing at Gloucester, in the State of Massachusetts, have invented certain new and useful Improvements in Systems of Radiocontrol, of which the following is a specification.

My invention relates to improvements in systems in which the movements of bodies or mechanisms are controlled or directed by radiant energy; and it relates more particularly to methods and apparatus by which a movable body such, for instance, as a torpedo, a boat, an air craft, a vehicle or a revolving lighthouse may be made to move toward, or to face in the direction of a source of radiant energy.

I have already shown several forms of my invention in my application for United States Letters Patent Serial No. 702,174, and in the present embodiment of my invention, I employ a source of radiant energy where electric or Hertzian waves will be generated and from which they will be radiated. At my receiving station, which may be on a torpedo or a boat, or on some other movable body, I use two or more receiving antennæ, arranged in loops at angles to each other, so that they will receive radiant energy in different amounts depending upon their orientation with respect to the source of energy. Connected with the receiving antennæ are detectors of electric or Hertzian waves which are connected with relays and other apparatus which, in turn, control mechanisms. When the torpedo or boat or other movable body faces or moves toward the source of energy, the receiving antennæ will receive energy in equal amounts and the detectors of electric waves will be equally affected, and the body will continue to face or move in the same direction. But when the body turns so that it no longer faces or moves toward the source of energy, the receiving antennæ will receive energy in different amounts, the detectors will be differently affected, and mechanisms will be set in operation which will tend to turn the body so that it again faces or moves in the direction of the source of energy, and the receiving antennæ receive equal amounts of energy.

In the drawings I have shown only receiving stations, but it is to be understood that I employ corresponding transmitting stations or sources of radiant energy.

Referring to the drawings:—

Fig. 3 shows a modified form of receiving apparatus on my system.

Figure 1:
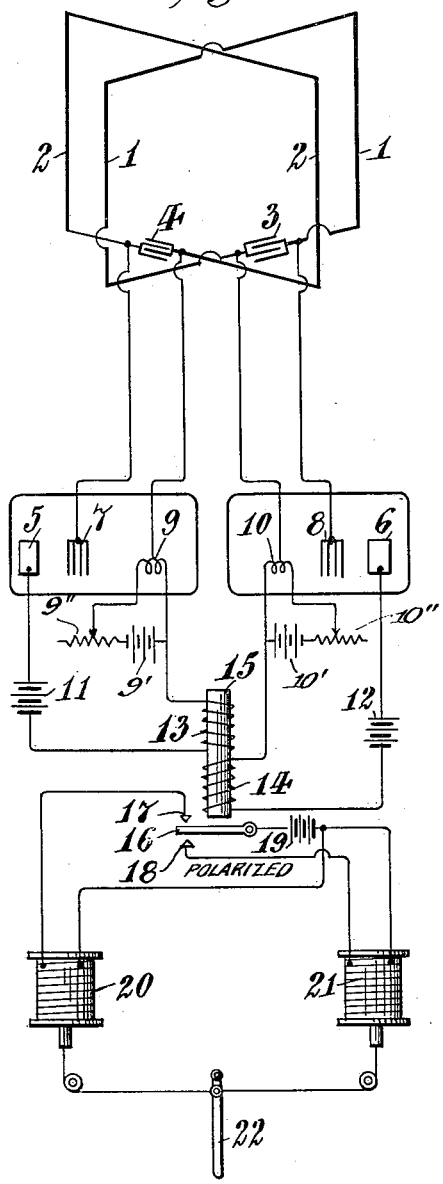
Figure 1 shows a receiving station on my system in diagrammatic form.

In Fig. 1, two closed loop antennæ, 1 and 2, contain each a condenser 3 and 4. Around these condensers are shunted the audions used as receiving detectors. The grids 7 and 8 of the audions are connected to one side of the condensers 3 and 4, respectively, and the filaments 9 and 10 are connected to the other side of these condensers. The filaments 9 and 10 are arranged to be heated in any well known or suitable manner, as for instance by batteries 9' and 10' acting through variable resistances 9'' and 10''. The plates 5 and 6 are connected in series with magnet windings 13 and 14, respectively, and the batteries 11 and 12, whose negative terminals are connected with the hot filaments 9 and 10 of the audions. The windings or coils 13 and 14 are wound in opposite directions about the core 15. A polarized armature 16 can swing so as to make contact with either contact 17 or contact 18, according as to which winding on core 15 is energized. The armature 16 is connected with the battery 19 and with the solenoids 20 and 21, these solenoids being also connected, respectively, with contacts 17 and 18, so that when the armature makes contact at 17, solenoid 20 will be energized, and when it makes contact at 18, solenoid 21 will be energized. The steering gear 22 or any other suitable mechanism can be controlled by the solenoids 20 and 21.

The directive effect of the closed loop antennæ is well understood in the art of radio transmission of energy, and the fact that the phase of the electrical oscillations received in the loop varies according to the orientation of the loop with respect to the source of energy. Therefore, according to the amount of energy stored in the condensers, so will be the value of the negative charge on the grids. The value of the negative charge accumulated on the grids will, as is well understood, determine the amount of the flux current traversing the audion from the filament to the plate. As this current passes through the coils 13 and 14 it will be seen that the differential relay will have its opposition windings more or less energized according to the phase relation of the currents in the closed loops. Since, as before explained, this matter of the phase difference in the loops is dependent entirely on their orientation with respect to the source of radiant energy, then it will be understood that the armature 16 will contact with either 17 or 18, according to whether or not the loops are placed at angles most favorably disposed with respect to the sending station.

Figure 2:
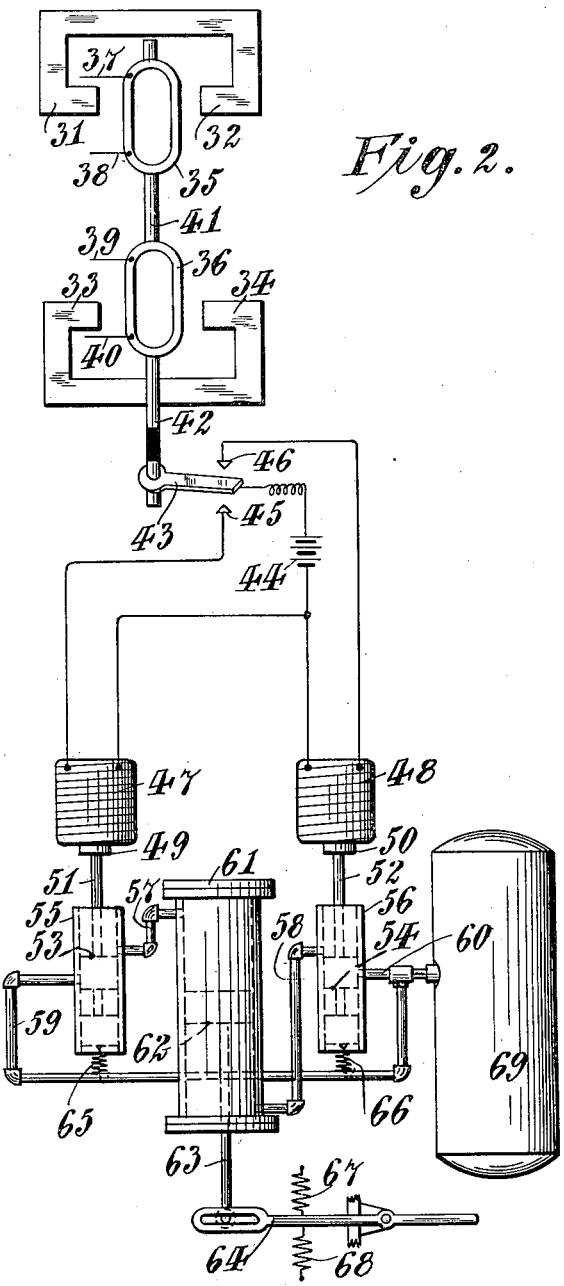
Fig. 2 shows some of the apparatus and mechanisms at a receiving station, partly in diagrammatic form.

Fig. 2 shows in more detail valve mechanisms controlled by a modified form of differential relay connected with the audions above described.

The differential coils 35 and 36 are mechanically connected by the wire or strip 41, and are suspended so that each is in a powerful magnetic or electromagnetic field, coil 35 being between the pole pieces 31 and 32, and coil 36 being between the pole pieces 33 and 34. Coil 35 is connected with one of the audions by means of the conductors 37 and 38, and coil 36 is connected with the other audion by means of the conductors 39 and 40. The contact finger 43 is mechanically connected with the coils 35 and 36 by means of the wire or strip 42, and this finger 43 can make contact with either contact 45 or contact 46, according as to which way the coils 35 and 36 turn. Contact finger 43 is electrically connected with battery 44 and solenoids 47 and 48. Contact 45 is connected with solenoid 47, and contact 46 with solenoid 48. Core or plunger 49 is attracted by solenoid 47 when the latter is energized, and by means of the rod 51 controls the motion of piston 53 in the cylinder 55. Core or plunger 50 is attracted by solenoid 48, when the latter is energized, and by means of the rod 52 controls the motion of the piston 54 in the cylinder 56. These pistons 53 and 54 and cylinders 55 and 56 act as valves to control the admission of compressed air or other suitable fluid from the tank or reservoir 69 to the cylinder 61. When both solenoids 47 and 48 are deënergized, pistons 53 and 54 are in their lower positions, as shown, pipes 59 and 60 are closed, and pipes 57 and 58 are open, so that both ends of cylinder 61 are open to the atmosphere.

When solenoid 47 is energized, piston 53 is moved so as to open a connection between pipes 59 and 57 and admit fluid into the upper end of cylinder 61. Piston 62 will therefore be forced downward and by means of rod 63 will operate the steering gear, or other mechanism, 64. When solenoid 48 is energized, piston 54 is moved so as to open a connection between pipes 60 and 58 and admit fluid into the lower end of cylinder 61. Piston 62 will therefore be forced upward and by means of rod 63 will operate the steering gear, or other mechanism, 64 in the opposite direction from before.

Spring 65 and 66 tend to restore pistons 53 and 54, respectively, to their original position, and springs 67 and 68 tend to keep the steering gear, or other mechanism, 64 in its central position.

Instead of the form of differential relay shown, it may sometimes be preferable to employ two sensitive relays with some form of mechanical connection between the two swinging coils. In this way any mutual induction between the two coils or undue friction or other bad effects found in the ordinary form of differential relay are obviated.

In Fig. 3, I show another means of obtaining the same differential result as before. The closed loops 71 and 72 act as receiving antennæ. In the drawing they are separated, but they may be crossed, as shown in Fig. 1, or arranged in other ways so long as they make an angle with each other, preferably a right angle when there are only two loops. These loops contain condensers 73 and 74. Suitable stopping condensers 75 and 76 are connected respectively, with the grids 77 and 78 of a special audion. The corresponding plates of this audion are 79 and 80, and 81 is the hot filament. This filament and both grids and both plates are contained in one vacuum bulb. The plates and filament form, with the resistances 83 and 84, the sides of a Wheatstone bridge. A sensitive double-contact relay 85 is also placed in this bridge, and is deflected to one side or the other according to the change of balance occuring in the system. A common battery 82 is used for heating the filament 81 and for supplying the necessary flux current to the plates 79 and 80. I find that such an arrangement is absolutely stable, and in most cases it is preferable to a system using two separate audions through a differential relay.

Whatever may be the nature of the receiving apparatus used with my system, it is to be understood that if the amounts of energy received therewith are very small, the effects of the received energy may be locally amplified by means of audions or other suitable amplifying devices so as to produce currents of sufficient strength to operate sensitive relays. In general, I do not confine myself to the particular apparatus and mechanisms here shown, but various changes and modifications, within the knowledge of those skilled in the art, may be made in the particular apparatus shown and described herein, without departing from the spirit of my invention, provided the means set forth in the following claims be employed.

Having thus described my invention, I claim:

1. In a system of radio control, a receiving station comprising antennæ, each of which is adapted to receive Hertzian waves from a given source in a quantitative degree depending upon its orientation with respect to said source, and a relay including a polarized armature operated when an excess of energy is received by any one of said antennæ.

2. In a system of radio control, a receiving station comprising a plurality of antennæ arranged in vertical loops at angles to each other, said antennæ being adapted to receive electric radiant energy in different degrees depending upon the angles they make with a vertical plane containing the line joining the source of energy with the receiving station, quantitative detectors of electric waves connected to said antennæ, a sensitive relay actuated by said detectors, and mechanisms controlled by said relay.

3. In a system of radio control, a receiving station comprising a plurality of loop antennæ arranged at angles to each other and adapted to receive electric radiant energy in different degrees, detectors of electric waves connected with said antennæ and adapted to be quantitatively affected by the energy received by the antennæ, a relay actuated by said detectors when they receive different amounts of energy, and fluid-operated mechanisms controlled by said relay.

4. In a system of radio control, a receiving station containing two loop antennæ at right angles to each other, and an audion connected to both of said antennæ, said audion consisting of two grids, two plates and one filament all contained in one vacuum bulb.

5. In a system of radio control, a receiving station containing two loop antennæ at right angles to each other, an audion connected to both of said antennæ, said audion consisting of two grids, two plates and one filament all contained in one vacuum bulb, each of said plates constituting with the filament one arm of a Wheatstone bridge, and a sensitive relay connected across said bridge.

6. In a system of radio control, a receiving station comprising a plurality of antennæ arranged to receive radiant energy in different degrees respectively, detectors of radiant energy connected to said antennæ, and a relay controlled by said detectors and arranged to be operated only when one of said detectors receives more energy than another of said detectors.

7. In a system of radio control, the combination with two looped antennæ, each of which is adapted to receive radiant energy from a given source in a variable degree depending upon the orientation of said antennæ with respect to said source, of two detectors of radiant energy connected with said elements respectively, and a relay including a polarized armature controlled by said detectors.

8. In a system of radio control, the combination with two elements, each of which is adapted to receive radiant energy from a given source in a variable degree depending upon the orientation of said element with respect to said source, of an audion connected to both of said elements, said audion including a bulb and two grids, two plates and one filament, all contained in said bulb, and a polarized relay controlled by said audion.

9. In a system of radio control, the combination of two antennæ, of an audion connected to both of said antannæ, said audion including one vacuum bulb and two grids, two plates and one filament, all contained in said bulb, each of said plates constituting with said filament one arm of a Wheatstone bridge, and a sensitive relay connected across said bridge.

10. A system for receiving radiant energy, comprising a plurality of looped antennæ arranged in different planes and adapted to receive electroradiant energy from a given source in different degrees depending upon the orientation of said antennæ with respect to said source, detectors of electric energy operatively connected with said antennæ, and a relay controlled by said detectors and arranged to be actuated when said detectors receive different amounts of energy.

This specification signed and witnessed this 19th day of January, A. D., 1914.

JOHN HAYS HAMMOND, Jr.

Witnesses:
Wm. Emerson Parsons.
Francis Bennett.